United States Patent [19]
Kimber

[11] Patent Number: 5,972,253
[45] Date of Patent: *Oct. 26, 1999

[54] PREPARATION OF MONOLITHIC CARBON FIBER COMPOSITE MATERIAL

[75] Inventor: Geoffrey M. Kimber, Lexington, Ky.

[73] Assignee: University of Kentucky Research Foundation, Lexington, Ky.

[ * ] Notice: This patent issued on a continued prosecution application filed under 37 CFR 1.53(d), and is subject to the twenty year patent term provisions of 35 U.S.C. 154(a)(2).

[21] Appl. No.: 08/935,631

[22] Filed: Sep. 23, 1997

Related U.S. Application Data

[60] Provisional application No. 60/027,193, Sep. 30, 1996.

[51] Int. Cl.$^6$ .............................. C01B 31/12; D04H 9/04
[52] U.S. Cl. ............................. 264/29.7; 428/295
[58] Field of Search ............................ 428/295; 264/29.7

[56] References Cited

U.S. PATENT DOCUMENTS

| | | | |
|---|---|---|---|
| 4,107,128 | 8/1978 | Hosoi et al. | 260/40 |
| 4,320,079 | 3/1982 | Minnear et al. | 264/102 |
| 4,681,718 | 7/1987 | Oldham | 264/102 |
| 4,772,508 | 9/1988 | Brassell | 428/218 |
| 4,818,448 | 4/1989 | Wrenn, Jr. et al. | 264/29.2 |
| 5,080,963 | 1/1992 | Tatarchuk et al. | 428/225 |
| 5,446,005 | 8/1995 | Endo | 502/433 |

OTHER PUBLICATIONS

Wei et al.; Carbon–Bonded Carbon Fiber Insulation For Radioisotope Space Power Systems; American Society Bulletin; vol. 64, No. 5; May 1985; pp. 691–699.

Kimber et al., Carbon Composites from Pre–Activated Carbon Fibers, Center for Applied Energ Research, University of Kentucky.

*Primary Examiner*—Robert W. Ramsuer
*Assistant Examiner*—Dominic Keating
*Attorney, Agent, or Firm*—King and Schickli

[57] ABSTRACT

A process for preparing an activated carbon fiber composite material includes the steps of mixing carbon fibers, binder and water to form a slurry, molding the slurry to produce a green monolithic body, curing the monolithic body, carbonizing the cured monolith to produce a carbon fiber composite with an open, permeable structure and activating the composite. If pre-activated carbon fibers are utilized in the mixing step the carbonizing and activating steps are eliminated.

6 Claims, No Drawings

PREPARATION OF MONOLITHIC CARBON FIBER COMPOSITE MATERIAL

This patent application claims the benefit of priority as hereby claimed on U.S. Provisional Patent Application Ser. No. 60/027,193, filed Sep. 30, 1996, entitled "Preparation of Monolithic Carbon Fiber Composite Material".

TECHNICAL FIELD

This invention relates to the field of carbon fiber composite materials and more particularly to a process for preparing a carbon fiber composite material.

BACKGROUND OF THE INVENTION

Carbon fibers are produced commercially from rayon, phenolics, polyacrylonitrile (PAN), or pitch. The latter type are further divided into fiber produced from isotropic pitch precursors, and those derived from pitch that has been pre-treated to introduce a high concentration of carbonaceous mesophase. High performance fibers, i.e. those with high strength or stiffness, are generally produced from PAN or mesophase pitches. Lower performance, general purpose fibers are produced from isotropic pitch precursors. These materials are produced as short, blown fibers (rather that continuous filaments) from precursors such as ethylene cracker tar, coal-tar pitch, and petroleum pitch prepared from decant oils produced by fluidized catalytic cracking. Applications of isotropic fibers include: friction materials; reinforcements for engineering plastics; electrically conductive fillers for polymers; filter media; paper and panels; hybrid yards; and as a reinforcement for concrete.

More recently, interest has developed in activated forms of isotropic carbon fibers, where high surface areas can be produced by partial gasification in steam or other oxidizing gases. Activated carbon fibers have novel properties that make them more attractive than conventional forms (powders or large-size carbons) for certain applications. While porosity can be generated in most types of carbon fiber, low modulus fibers produced from isotropic pitch are particularly suited for activation because of their unique structure, where the random packing of small crystallites allows the development of an extensive pore structure.

Among the possible applications, activated carbon fibers are of interest for the adsorption and recovery of organic vapors; in environmental protection; the removal of $SO_x$ and $NO_x$ from flue gas; the improvement of air quality; and water treatment. Difficulties in handling and utilizing activated carbon fibers can be surmounted by their incorporation into composites, such as woven and non-woven fabrics, felt and paper.

SUMMARY OF THE INVENTION

An object of the present invention is to provide a process for preparing a carbon fiber composite material in which the degree of anisotropy of the finished composite material may be controlled. Advantageously, the process provides for using a more concentrated slurry, preferably containing in the order of 10 weight percent of carbon fibers to produce a near isotropic composite material having superior physical characteristics when compared to highly anisotropic composites, made using prior technology when the slurry has only of the order of 1 weight percent fibers.

An object of the present invention is to provide a method for producing a composite material with an ability to better withstand stress during heat treatment and a reduced tendency to delaminate. This is accomplished by utilizing a slurry with a relatively high concentration of carbon fibers in water to produce the composite.

For some applications a degree of anisotrophy in some physical properties is desirable and the concentration of fibers in water is the prime variable that enables the optional composite properties to be achieved.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved process is provided for preparing an activated carbon fiber composite material. The process includes the step of mixing between one part by weight carbon fibers having a diameter between substantially 5–100 $\mu$m and a length between substantially 0.1–5.0 mm with between 0.05–1.0 parts by weight binder and 5–200 parts by weight water in order to produce a slurry. Next is the placing of this slurry in a molding vessel. This is followed by the filtering of the slurry to produce a green or monolithic body. Following the dewatering and drying of the green monolith is curing to produce a cured monolith. This is followed by the carbonizing of the cured monolith to produce a carbon fiber composite defining an open, permeable structure and activating of the carbon fiber composite so that the carbon fibers are made porous.

Advantageously, this slurry includes a relatively high concentration of carbon fibers in water. This functions to significantly reduce the ordered layering of the fibers in the mold and allows the production of a more random or isotropic composite material. Such a material is characterized by enhanced physical properties and is better able to withstand stress during heat treatment. Such a material also has a reduced tendency to delaminate. These are particularly important properties when the composite is utilized as an adsorbent and, for example, subjected to pressure fluctuations such as commonly occur in pressure swing adsorption processing.

In accordance with still another aspect of the present invention, the carbon fibers utilized in the mixing step are preactivated. When preactivated carbon fibers are utilized in the process, the carbonizing and activating steps are no longer necessary. This significantly reduces processing costs and means that the monolith need only be heat treated to a final temperature exceeding the intended operational temperature by an appropriate safety margin.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the descriptions will be regarded as illustrative in nature and not as restrictive.

DETAILED DESCRIPTION OF THE INVENTION

A novel method is hereby provided for making a carbon fiber composite material having a rigid, open, monolithic structure with high permeability. Further, the processing method allows the control of the composite's overall porosity.

The carbon fiber composite of the present invention is comprised generally of carbon fibers and a binder. The composite is strong and porous allowing fluids to easily flow through the material. At the same time, when activated, the carbon fibers provide a porous structure for adsorption.

Synthesis of the carbon fiber composite is generally comprised of mixing a selected carbon fiber and carbonizable organic powder (e.g. binder) with water to form a slurry. The desired monolithic body configuration is molded from this slurry. The resulting green form is dried and removed from the mold. The composite is cured prior to carbonization under an inert gas. The composite material is then activated to develop the pore structure of the fibers. The composite may then be readily machined to the desired final configuration.

If preactivated carbon fibers are used, neither the carbonization nor activation steps are necessary. Accordingly, for most applications the final heat treatment temperature only has to exceed the intended operational temperature by an appropriate safety margin. Advantageously, since the composite is not subjected to relatively high carbonizing and activation temperatures, the resulting monolith better maintains its size and shape which substantially correspond to the mold after curing. In fact, some of the cured resin may actually bind the monolith to the mold. Accordingly, in certain instances and for particular applications, it may be desirable to use a disposable mold which actually forms a support frame which allows carefree handling of the cured monolith product, protecting the edges/sides from direct mechanical contact with objects and possible chipping or flaking damage.

The fiber or fibers selected will depend upon the ultimate use of the resultant composite. The process described herein will focus on the production of a carbon fiber composite for use as a molecular sieve. For use as an adsorbent or molecular sieve, it is preferable to use carbon fibers derived from a suitable isotropic pitch precursor.

The manufacture of pitch based fibers is well known in the art and is briefly described herein. Pitch is conventionally derived from a heavy petroleum fraction. Fiber forming methods include melt spinning and melt blowing. During both of these processes, the pitch is heated to give a carefully controlled viscosity then forced through a number of fine orifices to produce fibers as the pitch resolidifies. In the spinning process the fiber diameter is controlled by drawing the fibers down and winding them onto a reel as they form. The blowing process employs a stream of air which draws the fibers down as it blows them onto a moving belt to form a random mat of "green" pitch fibers. In both methods, extreme care must be taken to control the temperature and other conditions. Once formed, the green fibers are "stabilized", by heating the fibers in an oxidizing atmosphere, so that they are rendered thermosetting and will retain their fibrous form at the high temperatures used in the subsequent carbonization step. After carbonization, the fiber mats contain about 95% carbon by weight.

In the preferred embodiment, the isotropic pitch precursor is formed such that the resultant fibers have a diameter of approximately 5–100 $\mu$m. The fibers can be in a stabilized or carbonized condition. The fibers are chopped or milled to a selected size. For the preferred embodiment, the processed fibers are of an average length of approximately 0.7 mm but the length may range from substantially 0.1–5 mm.

In the present method, one part by weight of carbon fibers having a diameter between 5–100 $\mu$m and a length between 0.1–5.0 mm, 0.05–1.0 and more preferably 0.2–0.5 part by weight powdered binder (eg. one part phenolic resin, two part phenolic resin, pitch, thermosetting resins, coal extracts, coals that soften) and 5–200 part by weight water are mixed in order to create a slurry. Such a slurry has between 5–200 cc of water per gram of carbon fibers. For example, for carbon fibers 700 $\mu$m in length and 17 $\mu$m in diameter between 8–10 l of water per kilogram of fibers may be used. For shorter or fatter fibers, less water is needed. Advantageously, the relatively low concentration of water reduces the forming time of the green monolith thereby speeding production. Further, it reduces the tendency of the carbon fibers to layer thereby producing a more random or isotropic composite material with enhanced physical characteristics. These include but are not limited to the ability to better withstand stress during heat treatment and activation and also a reduced tendency to delaminate.

The mixing is completed in a mixing tank. In the mixing tank, the binder and the fibers are added into a vortex formed by an agitator. Preferably the binder is first mixed with a minimum amount of water to a thick paste that ensures good homogeneity. The total amount of water used determines the anisotropy of the final composite. For minimal anisotropy the amount of water used should only be just above the minimum practical to produce a pourable or pumpable slurry.

The slurry is transferred to a molding vessel soon after it is made. The molding vessel can be of virtually any cross section (e.g. circular to make rods or blocks, annular to make tubes). The mold has a screen of stainless steel or other rigid material clamped at its bottom. The slurry is filtered through this screen by applying an overpressure of air or a vacuum to its underside or in most cases an adequate rate of filtration is achieved merely by relying upon the hydraulic head of the slurry.

The resulting green form is dewatered. In the preferred embodiment, this is partially done by passing air through the form. Once dewatered to perhaps 50% by weight, the form is removed from the mold. This is accomplished by unclamping the filter screen and applying a small pressure (e.g. 5 psi) either mechanically or pneumatically. This is often best done horizontally to avoid distortion of the relatively weak green composite. The green form is then dried and cured to produce a cured monolith. The drying and curing is completed in an oven to a temperature dependent upon the binder in use (e.g. to at least 150° C. in air for phenolic resins; 500° C. in nitrogen for coal). It should be appreciated that the rate of heat transfer to the composite controls the time for drying and curing but temperatures above 300° C. must not be used in air if burning of the fibers is to be avoided. Typically small specimens may be heated to 200° C. at 5° C./min. The composite is then baked and activated by heating it typically to 850° C. for one hour in an atmosphere of 50% steam and 50% nitrogen or at 950° C. in carbon dioxide. Other known means of activation may also be utilized.

Activation conditions can be varied by changing the activation gas, its concentration, the flow rate, the temperature and the optional presence of a catalyst to influence total surface area and pore size distribution. Further, the use of post activation treatments can be implemented. For example, further heating or the introduction of chemicals could affect the pore size distribution and surface chemistry.

Once carbonized or activated, the composite can be machined to any desired shape, forming a monolithic carbon fiber composite. Of course, as noted above, if preactivated carbon fibers are used the carbonizing and activating steps are not necessary.

Further, as also noted above, a disposable mold or mold liner may be used in which case either (1) after filtration blowing is continued with hot air to ensure rapid drying and curing, or (2) the discharged composite (in its sheath) is dried and cured in a separate oven. In this instance the composite remains adhered to its sheath. This is particularly advantageous in certain applications where subsequent sealing of a composite into a container may present problems. This method is particularly well suited when pre-activated carbon fibers are used since they are subjected to lower temperatures and better maintain their molded size and shape.

The composite formed by the above processes includes voids between the fibers which allow free flow of fluid through the material and ready access to the carbon fiber surface. Further, the individual carbon fibers are held in place by the pyrolyzed resin binder and thus cannot move or settle due to the flow of gases through the material.

The resultant activated carbon fiber composite is ideal for use as an adsorbent or molecular sieve in a pressure swing adsorption (PSA) process. Specifically, PSA is a known process for separation of gases from multicomponent gas mixtures. The PSA apparatus relies on the physical process of adsorption, in which gases are selectively adsorbed onto a substrate from a gas stream, thus depleting the stream of one gaseous species. The adsorbed gas is then desorbed at a lower pressure into a second gas stream thus enriching it with the desorbed species. The desorption step regenerates the adsorbent material for reuse during the subsequent adsorption step. It is widely acknowledged that PSA technology has fully matured and that further advances in this technology will require the development of superior adsorbent and molecular sieve materials which have significantly higher surface areas combined with mean micropore width of 5–10Å.

PSA systems typically comprise several adsorption beds, through which the gas stream is passed, allowing for the near complete separation of the selected gas species. The adsorbent materials used in a PSA unit are selected to have the appropriate mean micropore width (typically in the range of 5–10Å) to selectively adsorb or sieve the required gas species and additionally must possess large surface areas. Currently available adsorbent materials include zeolites, with surface areas in the range of 10–350 $m^2/g$, and activated carbons with surface areas in the range of 500–1000 $m^2/g$. Conventional activated carbons and carbon molecular sieves are granular in structure. During operation in a PSA system, granular materials suffer attrition and can settle resulting in the formation of channels which allow the fluid stream to bypass the adsorbent.

Although use of the carbon fiber composite as an adsorbent in the PSA process has been emphasized, there are several alternative uses. Carbon fibers derived form coal tar pitch, rayon, polyacrylonitrile (PAN) or heavy oils such as oil shale residue and refinery residue can be utilized in the production of the composite. Further, the fibers can be vapor grown. The fibers or a blend of different carbon fibers can be utilized to control the characteristics of the resultant carbon fiber composite. More specifically, the strength, thermal conductivity, pore size distribution, density and electrical properties are examples of the characteristics that can be modified or controlled with the appropriate carbon fiber or blend of carbon fibers.

By selecting a different carbon fiber and altering selected parameters in the production process, the carbon fiber composite can be modified for use in a variety of applications. For example, the carbon fiber composite can be utilized in gas purification, especially in confined spaces where the higher rates of adsorption on activated carbon fiber composites offers potential space savings. Further, a mesoporous carbon fiber composite is suitable for use in liquid phase applications or as a catalyst support.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A process for preparing an activated carbon fiber composite material comprising the steps of:

mixing between about 5–about 12 weight percent of carbon fibers having a diameter between about 5–about 100 μm and a length between about 0.1–about 5.0 mm with between about 1.25–about 3.0 weight percent binder and water in order to produce a slurry;

placing said slurry in a molding vessel;

filtering said slurry thereby producing a green monolithic body;

dewatering and drying said green monolithic body;

curing said green monolithic body thereby producing a cured monolithic body;

carbonizing said cured monolithic body thereby producing a carbon fiber composite defining an open permeable structure resistant to delamination; and activating said carbon fiber composite whereby said carbon fibers are made porous.

2. A process for preparing an activated carbon fiber composite material comprising the steps of:

mixing between 5–12 weight percent of carbon fibers having a diameter between 5–100 μm and a length between 0.1–5.0 mm with between 1.25–3.0 weight percent binder and water in order to produce a slurry;

placing said slurry in a molding vessel;

filtering said slurry thereby producing a green monolithic body;

dewatering and drying said green monolithic body;

curing said green monolithic body thereby producing a cured monolithic body;

carbonizing said cured monolithic body thereby producing a carbon fiber composite defining an open permeable structure resistant to delamination; and activating said carbon fiber composite whereby said carbon fibers are made porous.

3. A process for preparing a pre-activated carbon fiber composite material comprising the steps of:

mixing between about 5–about 12 weight percent of pre-activated carbon fibers having a diameter between about 5–about 100 μm and a length between about 0.1–about 5.0 mm with between about 1.25–about 3.0 weight percent binder and water in order to produce a slurry;

placing said slurry in a molding vessel;

filtering said slurry thereby producing a green monolithic body;

dewatering and drying said green monolithic body; and curing said green monolithic body thereby producing a cured, pre-activated carbon fiber composite defining an open permeable structure resistant to delamination.

4. The process set forth in claim 3, including retaining at least a portion of said mold about said carbon fiber composite to serve as a mechanical support.

5. A process for preparing a pre-activated carbon fiber composite material comprising the steps of:

mixing between 5–12 weight percent of pre-activated carbon fibers having a diameter between 5–100 μm and a length between 0.1–5.0 mm with between 1.25–3.0 weight percent binder and water in order to produce a slurry;

placing said slurry in a molding vessel;

filtering said slurry thereby producing a green monolithic body;

dewatering and drying said green monolithic body; and curing said green monolithic body thereby producing a cured, pre-activated carbon fiber composite defining an open permeable structure resistant to delamination.

6. The process set forth in claim 5, including retaining at least a portion of said mold about said carbon fiber composite to serve as a mechanical support.

* * * * *